United States Patent [19]

Guier

[11] E Re. 29,995

[45] Reissued May 15, 1979

[54] DUAL ELEVATORS

[76] Inventor: William C. Guier, 3100 E. 71st St., Tulsa, Okla. 74136

[21] Appl. No.: 863,535

[22] Filed: Dec. 22, 1977

Related U.S. Patent Documents

Reissue of:

[64] Patent No.: 4,035,012
Issued: Jul. 12, 1977
Appl. No.: 645,904
Filed: Dec. 31, 1975

[51] Int. Cl.[2] ..... B66C 1/10; E21B 19/06
[52] U.S. Cl. ..... 294/90; 24/249 DP
[58] Field of Search ..... 294/90, 91, 102 A, 113; 24/249 DP, 263 D, 263 DA; 166/77.5, 85; 175/85, 195; 214/2.5

[56] References Cited

U.S. PATENT DOCUMENTS

| | | | |
|---|---|---|---|
| 1,490,445 | 4/1924 | Wilson | 294/90 |
| 1,547,282 | 7/1925 | Youker | 294/90 |
| 1,755,986 | 4/1930 | Goetz et al. | 24/249 DP |
| 2,215,649 | 9/1940 | Mullinix | 294/90 |
| 2,313,243 | 3/1943 | Johnson | 214/2.5 |
| 2,684,166 | 7/1954 | De Jarnett | 294/90 X |
| 3,063,509 | 11/1962 | Guier | 214/2.5 X |
| 3,494,484 | 2/1970 | McFadden | 294/90 X |
| 3,833,971 | 9/1974 | Grasman et al. | 24/249 DP X |

*Primary Examiner*—Johnny D. Cherry

*Attorney, Agent, or Firm*—Head, Johnson & Chafin

[57] ABSTRACT

This invention relates to an improved elevator as used in the drilling industry for latching onto and transporting drill pipe. The improvements are particularly adaptable for elevators used in a dual automatic elevator system as described in U.S. Pat. No. 3,063,509. The improvements include: (a) an arrangement wherein an elevator base may be utilized to accept a variety of different sizes of drilling pipe with a variety of different shoulder configurations on the tool joint end of the drilling pipe; (b) an elevator having a removable base so that the elevator may be utilized either for the dual automatic system of U.S. Pat. No. 3,063,509 or as an elevator as used in the commonly practiced single elevator drilling system; (c) an elevator having means for remotely unlatching the door when it is desired to remove the elevator from engagement with a drill pipe without requiring manual unlatching of the door; and (d) means of adjusting the angle of tilt of the elevator suspended by bails so that the elevator is properly orientated for engaging a drill pipe. These advantages and improvements are accomplished utilizing a removable bushing to accept different sizes of pipe, in conjunction with a replaceable door to match with each bushing, and the other improvements include removable lower plate, a pivotally adjustable counterweight for changing the angle of suspension of the elevator and hydraulically controlled linkage means for unlatching the elevator door by remote application of fluid pressure.

14 Claims, 7 Drawing Figures

DUAL ELEVATORS

Matter enclosed in heavy brackets [ ] appears in the original patent but forms no part of this reissue specification; matter printed in italics indicates the additions made by reissue.

CROSS REFERENCE TO RELATED PATENTS

This application is related to the Guier U.S. Pat. No. 3,063,509, dated Nov. 13, 1962, entitled "Apparatus for Handling Stands of Pipe." U.S. Pat. No. 3,063,509 is inserted by reference into this application.

BACKGROUND OF THE INVENTION

This invention relates to an apparatus for handling stands of pipe, as when making up and breaking out long strings of pipe used in a borehole for drilling wells. The apparatus is supported by a travelling block suspended by cables in a drilling rig mast and is adapted to encircle and support a string of drill pipe by engagement with the tool joint of the end of the pipe. Devices of this type are referred to in the petroleum drilling industry as "elevators."

One of the problems with the present day elevators is that of matching the elevator to the particular type of drill pipe being used. In the industry today the use of 3½, 4, 4½ and 5 inch drill pipe is common. In addition, with any given size of drill pipe there are a variety of different shoulder configurations on the tool joints integrally formed at the end of the drill pipe. For these reasons a wide variety of different elevators must be manufactured and carried by supply houses to meet the demands of the drilling industry. An object of this invention is to provide an improved elevator which is capable of being utilized on a variety of sizes of drill pipe, for instance, from 3½ inches to 5 inches, using the same elevator body with different small and relatively inexpensive components In Guier U.S. Pat. No. 3,063,509 there is described a useful and effective apparatus and system for handling stands of drill pipe. The system involves the use of an elevator of particular design which has two shoulders and overhanging hooks, which can be engaged respectively by two bails which are supported from the traveling block. On the rotary table there are two horizontal spaced apart parallel rails, one on each side of the drill pipe receiving central opening. These rails are co-linear continuations of a pair of rails supported on the floor of the derrick at the level of the top of the rotary table. The elevator has a base which is adapted to seat on the rails and be guided by the rails so that the elevator can be moved horizontally from a position over the rotary table to a position displaced along the rails from the rotary table, where it can remain while the rotary table is turning, and the pipe is drilling.

By the use of two elevators there is always one elevator on the rails displaced from the rotary table while the second elevator is raising or lowering pipe. When the pipe is lowered into the borehole through the rotary table, it is supported in the elevator. The bails are automatically released from the overhanging hooks and slid along the rails where they are made to engage the overhanging hooks of the second elevator, which can then be lifted to bring a second stand of pipe, for example, to be joined with the pipe supported in the elevator on the rotary table. After the new stand of pipe is made up, the pipe is lifted by the second elevator, and the first elevator is the removed from the pipe and is slid along the rails to the waiting position. The pipe is then lowered and supported in the rotary table by the second elevator, and so on.

The elevators utilized in the dual automatic elevator system of U.S. Pat. No. 3,063,509 includes automatic means for locking the elevator rails to the elevator when the rails are engaged for lifting the elevator. This automatic locking means is not required if the elevator is utilized for the commonly used procedure wherein only single elevators are employed. This invention provides interchangeable bases to the elevator, so that an elevator body may be utilized for the commonly employed single elevator system, or with the use of a different base, the dual elevator system of U.S. Pat. No. 3,063,509.

Another problem with elevators in use today is that they must customarily be manually unlatched to release them from engagement with drill pipe. This is particularly disadvantageous in a dual elevator system. The present disclosure includes means whereby a remotely controlled pressure signal may be employed to automatically unlatch the elevator as desired.

Another problem encountered with the use of elevators is that they sometimes are not properly inclined at the correct angle when swung into position by an operator to engage and lock around a drill pipe. Side door elevators, including the type illustrated in U.S. Pat. No. 3,063,509, include a finger on the door which, when engaged with a length of drill pipe, causes the door to close. This works efficiently and the pipe is received satisfactorily within the elevator as long as the axis of the opening through the elevator is parallel to the axis of the drill pipe as the elevator is swung into position to engage the drill pipe. Since elevators are normally pivotally swung from the bails there presently exists no easy way of controlling the angle of the elevator relative to the bail. This invention provides a means of selectably varying the angle of the axis of opening through the elevator relative to the vertical so that it can be adjusted to be most convenient for use by the operator in engaging drill pipe.

SUMMARY OF THE INVENTION

The disclosure herein provides an elevator of the side door type having significant improvements over elevators as presently utilized in the petroleum drilling industry. The elevator described includes a body portion with interchangeable bushings and doors which may be employed so that a single body portion may be adapted to engage and transport a variety of sizes of drill pipe and a variety of shoulder configurations on the tool joint ends of the drill pipe. The elevator includes counterbalancing means to selectably vary the attitude of the elevator as it is suspended by bails and a removable base so that the elevator may be utilized in a standard single elevator drilling system or with a different base in the dual elevator drilling system as described in U.S. Pat. No. 3,063,509. Further, the elevator described herein includes hydraulic means functioning by way of a cylinder piston and linkages to control a latch for remotely unlatching the door of the elevator.

OBJECT OF THE INVENTION

The primary object of this invention is to provide an improved elevator for use by the petroleum industry.

It is a further object of this invention to provide an elevator in which the central opening has a shoulder in which replaceable bushings can be inserted, so that bushings can be provided with a central opening diameter which is suited to the diameter of the pipe to be used. Also, the contour of the central opening of the bushing is designed to fit the contour of the tool joints. This, elevators can be quickly converted from one size and type of drill pipe to another by changing bushings. It is a still further object of this invention to provide an elevator with replaceable doors over the front opening, which doors are made with different internal contour to suit that of the bushing which is being used in the central opening of the elevator.

It is a still further object of this invention to provide a door-latching mechanism which is operated by a pressure fluid cylinder, through mechanical linkage.

Another object of this invention is to provide an elevator having means of adjusting the angle of tilt to facilitate engagement with drill pipe.

These and other objects in this invention by providing an elevator which has a central opening which provides a shoulder, on which can be seated one of a plurality of centralizing bushings, each bushing of different internal diameter to suit a particular size of drill pipe. The central opening of the bushings also provides a conical contour or a shoulder which is designed to fit the tool joint of the pipe. When a string of pipe is inserted through the door into the opening of the elevator, the pipe will be supported by the tool joint, so that slips or other means for supporting the pipe, which have sharp teeth which can cut into the surface of the pipe, will not be needed.

To fit the internal contour of the varous centralizing bushings, it is part of the invention to provide a corresponding series of doors for the elevator, each door having an internal surface when the door is closed which matches that of the particular bushing which is in place. Consequently, when the door is closed, the internal surface is symmetrical and continuous and is adapted to provide full support for the drill pipe.

A further improvement involves the use of a fluid pressure cylinder mounted on the back of the elevator which operates through a lever. A shaft carried from the back to the front of the elevator and a latching arm attached to the shaft can latch or open the door of the elevator.

Another improvement involves the use of a replaceable base for an elevator body adapting the elevator for different usages.

Another improvement of this invention involves the use of an arm bolted to the back surface of the elevator, the arm carrying an adjustable counterweight, such that the rotational torque of the counterweight acting on the elevator (when it is supported by the bails, without pipe), rotates the elevator to an angle which better fits the sloping position of the pipe. Thus the pipe fits into the central opening more completely and easily and permits the door to be closed with less force. In other words, when the elevator is clamped around the pipe, the counterweights serve to align the axis of the central bushing of the elevator to the axis of the pipe and thus permits the door to close freely and be locked before the weight of the pipe is placed on the elevator.

BRIEF DESCRIPTION OF THE DRAWINGS

These and other objects and advantages of the invention and a better understanding of the principles and details of the invention will be evident from the following description taken in conjunction with the appended drawings in which.

DESCRIPTION OF THE PREFERRED EMBODIMENT

Figure 1:
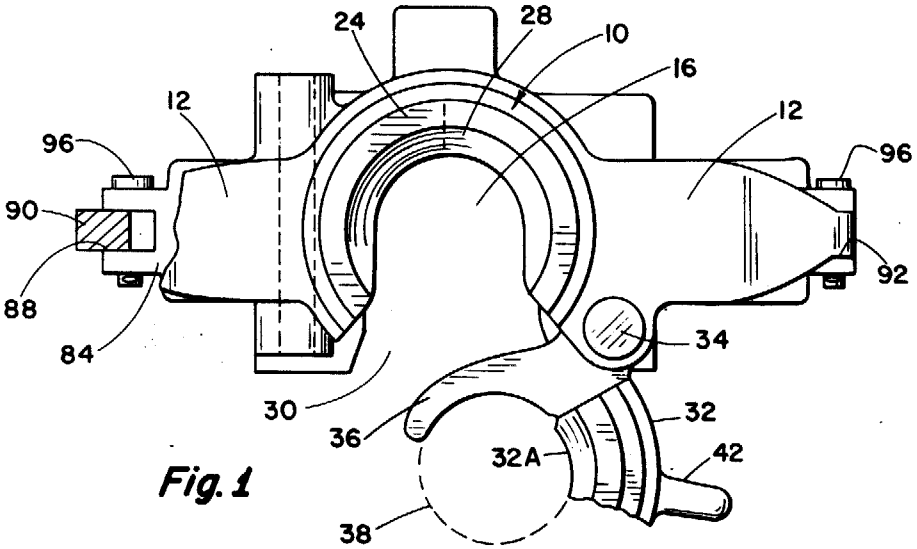
FIGS. 1 and 2 show plan and elevation views respectively of the elevator of this invention and particularly illustrating the replaceable bushing and door.
Figure 2:
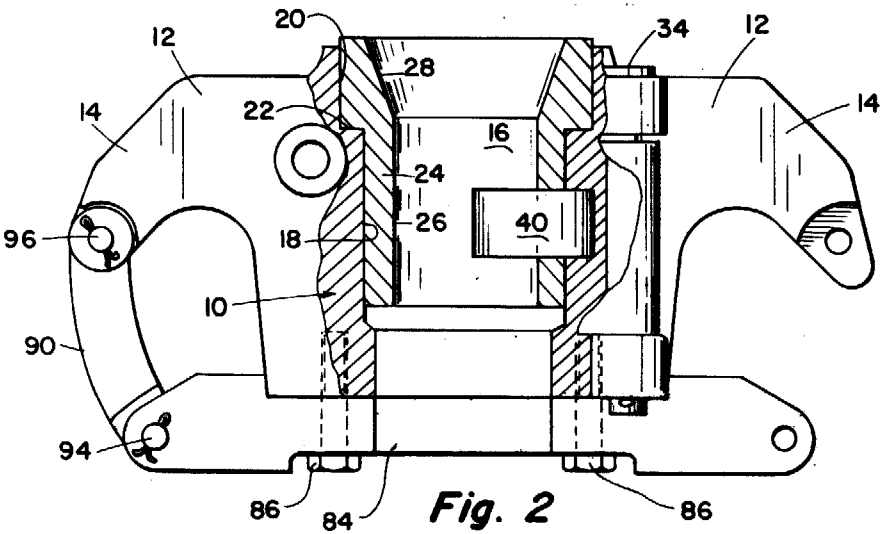

Referring now to the drawings and in particular to FIGS. 1 and 2, there is shown in plan and elevation one embodiment of the invention. The body of the elevator is indicated by the numeral 10. There are two shoulders 12 terminating in hooks 14 by means of which the elevator and the pipe which may be supported from it, are supported by the traveling block. A central opening 16 of the elevator is provided by a cylindrical bore 18 with a larger bore 20 at the top, providing a shoulder 22. A separable busing 24 is adapted to fit the bore 18 and 20 and the shoulder 22. In order to affix to and elevate different sizes of drill pipe different bushings 24 are employed. Each bushing 24 has an inner diameter 26 adapted to fit the particular drill pipe being used in the drilling apparatus. The upper contour 28 of the bushing is designed to fit the contour of the lower shoulder of tool joint on the end of the drill pipe. This may be a conical seat as shown, or it might involve a rectangular shoulder in case the lower surface of the tool joint is square, and so on.

By having a group of bushings 24, each of the same outer diameter and contour but with different internal diameters and contour, the same elevator body 10 can be used for various types and sizes of drill pipes.

As shown in FIG. 1, there is a front opening 30 of the central opening 16 which, in operation of the elevator, is closed by a door 32 which is hinged about a pin 34 journaled in the main body of the elevator. This door has a finger 36 which is part of the door. As pipe moves into opening 16 (indicated by the dashed circle 38) it contacts the finger 36, causing door 32 to be rotated about the shaft 34 and close around the pipe. As the door rotates and the pipe moves into the opening 16 the finger recedes into a cavity 40 shown in FIG. 2, which is cut into the bushing 24 and the wall of the elevator.

Figure 3:
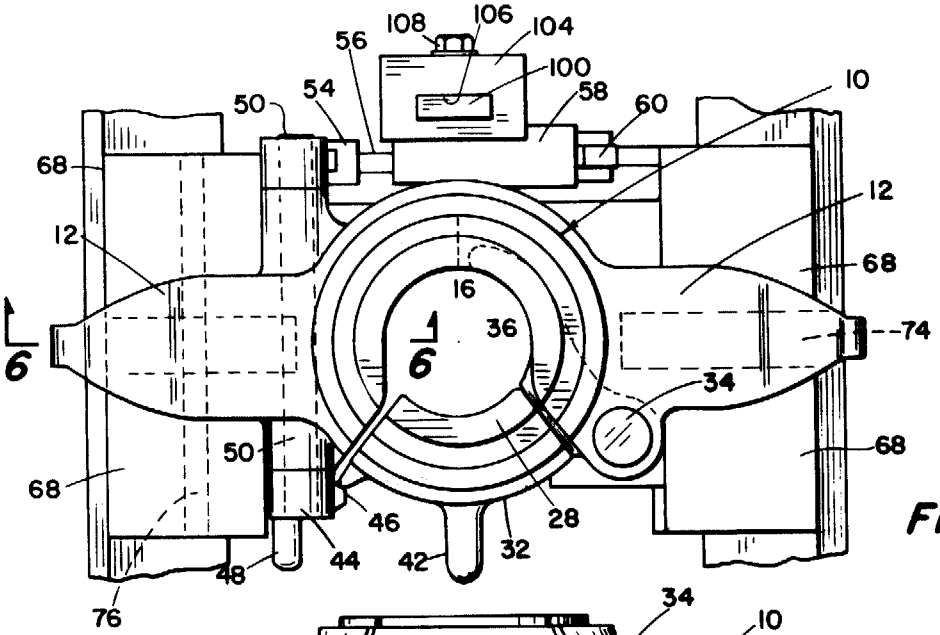
FIGS. 3 and 4 show plan and elevation views of a second embodiment of this invention, providing detail of the latching mechanism.

The internal surface 32A of the door 32 is configured such that when closed it must form a continuation of the internal surfaces 26 and 28 of bushing 24 so that when the door 32 is closed and latched there will be full support of the pipe and the tool joint. Thus, for each different bushing 24 there is a different door 32, each door having an internal surface configuration that when the door is closed and latched it will, as shown in FIG. 3, form a symmetrical central opening. Consequently, with each bushing there will be a different door, and pairs of these two parts will be provided so that any selected size of pipe and type of tool joint can be handled effectively with the same elevator body.

Figure 4:
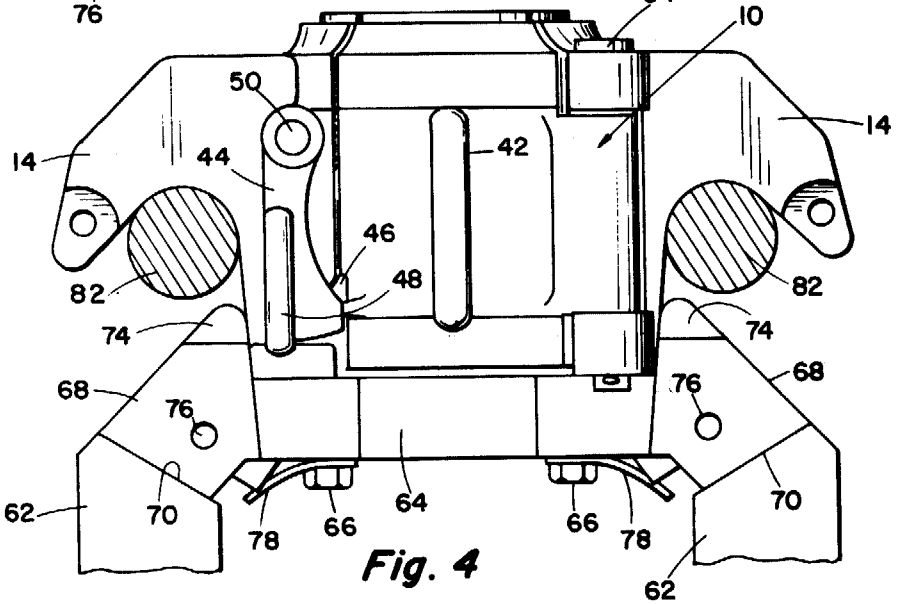

Referring to FIG. 4, an improved means of latching and unlatching the elevator door is shown. FIG. 4 is a front view of the elevator and door 32, showing door handle 42. A latch arm 44 is adapted, in one position, to extend over a portion 46 of the door. In that position of the latch 44 the door cannot be opened. There is a part 48 of the latch 44 which can be grasped manually to pull it in a clockwise rotation around shaft 50 to open the latch of the door and permit the door to open.

Shaft 50 is journaled in the elevator body 10 in a horizontal position, running from the front to the back of the elevator, as shown in FIG. 3. On the back end of the shaft 50 is an operating arm 52 which is shown more clearly in FIG. 5. The arm 52 depends downwardly from shaft 50 and is connected through a clevis 54 to a piston rod 56 which is part of a pressure fluid cylinder 58. Cylinder 58 is supported at a pivot 60 attached to the back of the elevator body.

By operation of the piston (not shown) in cylinder 58 so that, for example, the piston rod 56 moves to the left, the arm 52 will rotate the shaft in a clockwise direction viewed from the front and will carry with it the latching arm 44 which, as it turns, will free the latching portion 46 so that the door 32 can be opened. Cylinder 58 can be supplied by pressure fluid through a small diameter hose (not shown) which is mounted on a reel (not shown) in the derrick, such that as the elevator moves up or down the hose will be connected or a hose may loop from an upper portion in the derrick and connect with the elevator, the loop changing elevations as the elevator is moved up and down. By means of a fluid control valve (not shown) the door can be unlatched automatically and remotely using pressure fluid.

When a stand of pipe is being lowered to and is jointed to the pipe standing in the rotary table, as when the tool joint is made up, the pipe is lifted, freeing the weight from the elevator sitting on the rotary table. The door of the elevator may then be unlatched manually or hydraulically using the parts 50 through 60 described above. The elevator may then be pulled toward the back by hydraulic means so that it will slide along the rails 62 to a position at the side of the rotary table. All of this is explained in the U.S. Pat. No. 3,063,509. As the elevator door is unlatched and is pulled to the back, movement of the pipe out of the opening 16 will cause the door to open into the position of FIG. 1.

In FIG. 4 is shown a view of the elevator with a base portion 64 which is bolted by means of bolts 66 to the bottom surface of the elevator body 10. This case portion 64 has opposed rails 68, one on each side which are adapted to fit on the sloping surfaces 70 of two spaced apart tracks 62. One portion of each of the tracks 62 is supported on the rotary table and there are corresponding tracks (not shown), but fully described in U.S. Pat. No. 3,063,509) which are co-linear with those on the rotary table and extend to the back of the rotary table. The elevator can be pulled back from the rotary table by hydraulic means (not shown) attached to a bail 72 (see FIG. 5) to permit the pipe to be lowered, and the elevator then supporting the pipe will rest on tracks on the rotary table.

Figure 7:
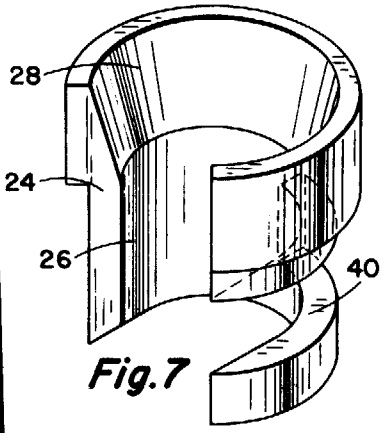
FIG. 7 is an isometric view of an embodiment of the replaceable bushing which may be utilized in the elevator body.
Figure 6:
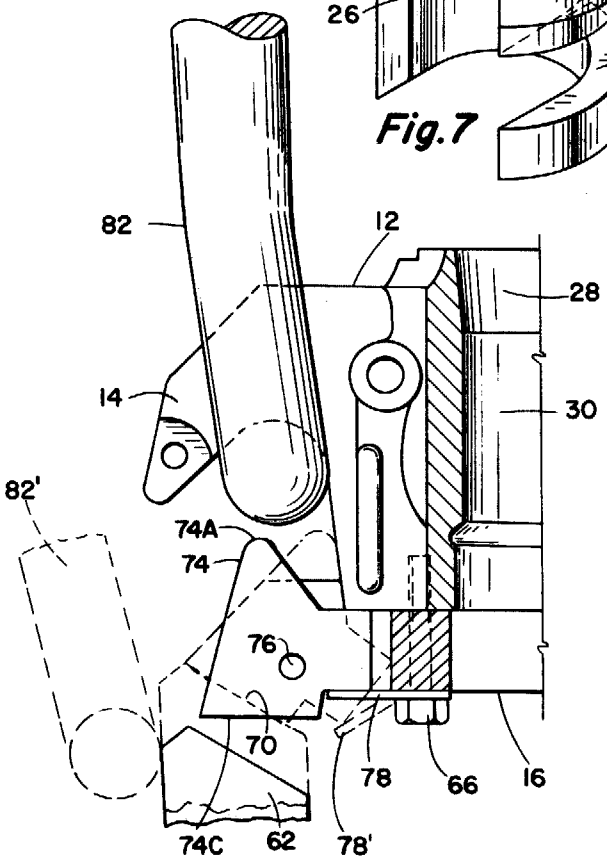
FIG. 6 is a partial side elevational view showing further details of the bail locking mechanism.

The two rail portions 68 are separated, as shown by dashed line in FIG. 3, by a space in which is placed a rotatable locking member 74 (see also FIG. 6). Each locking member 74 is retained in place and rotated around a pin 76. Each locking member 74 has a portion 74A which extends towards body hook portion 14. Leaf springs 78 held against body 10 by bolts 66 serve to rotate the locking members 74 so that the portions 74A extend toward hook portions 14 except when surface 74C engages surfaces 70 of tracks 62. When the elevator is sitting on tracks 62, the portions 74A of the locking member 74 are withdrawn. When a bail 82 is received under hooks 14, the diameter of the bail is greater than the opening between the hook 14 and the locking member portions 74A, consequently there is no way for the bail to be removed from its position under the hook 14 so long as the locking members 74 are in their normal position.

Tracks 62 have sloping surfaces 70 shown in FIG. 4 and in FIG. 6. When the elevator is lowered so that the rails 68 rest on the tracks 62, then the locking member 74 rotates to the positions shown in dashed outline in FIG. 6. This permits a full opening under the hook 14 for the bail 82 to be lowered to a position along the outside surfaces of the tracks 62. The bail is shown in dashed outline 82' when the elevator is lowered onto tracks 62 and the bails have slipped out of the hooks 14 and are resting outside of tracks 62. In this position the elevator is free of the bails and can be moved along the tracks either to or from the position over the rotary table.

The elevators as illustrated and described in U.S. Pat. No. 3,063,509 are adapted to be used only in the complete system in which the elevators are positioned on tracks to unlatch the hooks from the bails. An important improvement encompassed in this disclosure is a means whereby a single elevator body 10 may be employed to perform the normal elevator function using a single elevator to run pipe into and out of a hole. The elevator adapted for single elevator use is best illustrated in FIG. 2. Here are elevator base 84 of relatively flat construction is secured to the elevator body 10 by means of bolts 86. The outer end of the base 84 has slots 88 (see FIG. 1) which receive a bail retainer length 90. In like manner the body hook portions 14 include slots 92 (see the right portion of FIGS. 1 and 2) which receive the upper end of the bail retainers 90. Pins 94 extend through the base 84 in the lower end of bail retainer 90 and, in like manner, pins 96 extend through the hook 14 in the upper end of bail retainers 90 to maintain the retainers in position. Keys as illustrated may be utilized to maintain the pins 94 and 96 in position.

The arrangement for retaining bails is shown in FIG. 2 with the removable base 84, means that the elevator body as illustrated herein may be employed for adapting the elevator to a normal usage wherein it is maintained in connection with the bails for running pipe in and out of the hole when only one elevator is employed and when the tracks as illustrated in FIGS. 3 and 4 are not utilized, it can be seen that the base portion 64 of FIGS. 3 and 4 is interchangeable with the base portion 84 of FIGS. 1 and 2 to adapt the elevator body 10 to either its normal single elevator operation or to the dual automatic elevator operation of the system described in U.S. Pat. No. 3,063,509. While in FIG. 2 the base 84 is shown supported to the body with bolts 86 it can be seen that if desired the base may be welded to the body 98.

When the universal elevator body 10 is employed according to the teachings of this invention having the replaceable bushings 24 and replaceable bases 64 and 84 with the replaceable doors 32 it can be seen that a manufacturer can materially reduce the cost of providing elevators to meet different requirements including different sizes of drilling pipe and different tool joint end configurations. This adaptability can result in greater savings to manufacturers, suppliers, and users of elevators which has not heretofore been possible.

Figure 5:
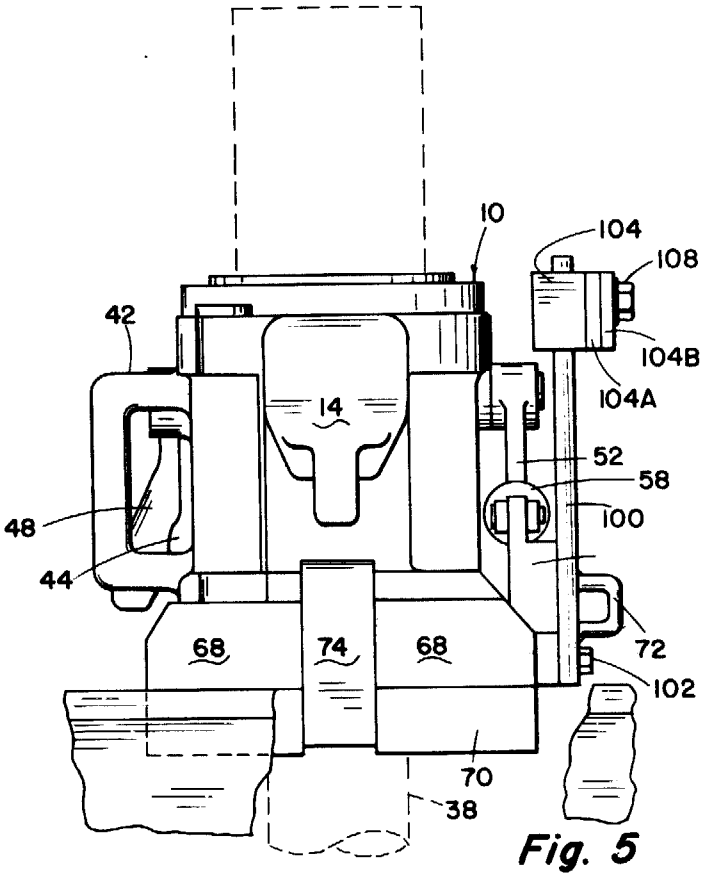
FIG.5 is a side view of the embodiment of FIGS. 3 and 4 and illustrates further details of the latching mechanism and the counterweight.

When drilling pipe is removed from a well hole to change the bit or for any purpose the drill pipe is stacked and an operator standing in the upper portion of the derrick guides the pipe in the stacked position and releases the elevator therefrom. This is the case whether the elevator is used in the normal manner or in the dual automatic system of U.S. Pat. No. 3,063,509. When the pipe is to be rerun back into the hole a man must stand at the upper portion of the derrick and when the elevator is raised into position to grasp a new length of pipe to be lowered in the hole, he must guide the elevator into engagement with a length of drill pipe. When the elevator is moved onto a pipe the finger 36 engages the pipe to close the door so that it automatically latches. However, to effectively engage the pipe the angle of tilt of the elevator is important. If the elevator is constructed such that with the door closed it has the center of gravity directly beneath the elevator, when the elevator door 32 is opened the center gravity shifts and there is a tendency for the elevator to tilt downwardly by the weight of the door. This can cause the elevator to improperly function when the operator brings the elevator manually into position to engage and clamp around the upper end of a vertical length drill pipe. FIGS. 3 and 5 illustrate a means of compensating for the tilt which takes place due to the open door 32 of an elevator.

As shown in FIG. 5, there is a vertical bar 100 which is attached to the base 64 of the elevator by means of a bolt 102. A weight 104 has a central opening 106 adapted to slide on the bar 100. The weight can be fastened aat any desired point by means of a lock bolt 108.

When the elevator is supported in the bails under the hooks 14, the additional weight of 104 supported at the back of the bail will cause the elevator to tilt to a selected angle from the vertical. This angle of tilt can be adjusted to match the angle of a stand of pipe which is to be inserted into the elevator and to compensate for the weight of door 32. Since the central bore and the bushings are adapted to fit fairly snugly to the sides of the pipe, the ability to tilt the angle of the elevator to suit the angle of the axis of the pipe makes it possible for the pipe to be inserted into the elevator and the door to be closed with much less effort than if the axis of the elevator is at a different angle than the axis of the pipe. Consequently, the counterweight 104 is important in the fast and efficient operation of the elevator in clamping to a stand of pipe.

Weight 104 includes portions 104A and 104B which may be added or removed to vary the total weight used to provide the desired tilt to the suspended elevator. Thus the tilt of the suspended elevator may be selected by: (a) varying the angle of bar 100 relative to the elevator body: (b) varying the elevational position of weight 104 on bar 100; and (c) varying the amount of weight by adding or removing portions 104A and 104B.

While the invention has been described with a certain degree of particularity it is manifest that many changes may be made in the details of construction and the arrangement of components and details of operation. It is understood that the invention is not to be limited to the specific language used or the specific embodiments set forth herein by way of exemplification of the invention, but the invention is to be limited only by the scope of the attached claim or claims, including the full range of equivalence to which each element or step thereof is entitled.

What is claimed is:

1. An elevator apparatus handling stands of drill pipe in a mast or derrick, comprising:

a. an elevator body having a central opening;

b. a hinged door at the front of said body to close said opening;

c. a shaft journalled in said body in a direction from front to back;

d. a latch arm affixed to the front end of said shaft, the latch arm being movable from a first position where it overlaps a portion of said door to latch it in the closed position to a second position where it is clear of said door to unlatch it by rotation of said shaft;

e. an operating means affixed to said shaft at the back of said elevator; and f. piston cylinder means connected between said operating means and said elevator body for latching and unlatching said door.

2. An elevator as in claim 1 wherein said elevator body central opening has an internal shoulder and including:

a bushing of a selected internal diameter and seating surface suited to the specific diameter of the drill pipe to be carried and of the same shape of the tool joint, the bushing having an external diameter and configuration to match said body central opening and to engage said internal shoulder, said central opening and central bushing having a sector cut away as a door opening on the front side; and the inner surface of said door matching the inner surface of said bushing such that when said door is closed, the contour of the inner surface of said bushing and door are symmetrical.

3. An elevator as in claim 1 including:

adjustable counterweight means attached to said elevator providing means of adjusting the angle of tilt of the elevator when pivotally suspended from supporting bails.

4. An elevator as in claim 1 including:

a vertical arm adjustably supported to said body; and a counterweight adjustably supported to said vertical arm.

5. An elevator according to claim 1 including:

a base removably affixed to the lower portion of said body.

6. An elevator according to claim 5 wherein:

said base includes opposed planar surfaces adaptable to slidably support the elevator on parallel tracks.

7. An elevator according to claim 5 wherein:

said base has opposed ends each having means of receiving a bail retainer thereto and wherein said body has integral opposed outwardly extending bail receiving hooks, a portion of each having a means of receiving a bail retainer therein; and a bail retainer removably attached to said body hook portion and said base opposed ends to retain bails received beneath said hook portions.

8. An elevator for removably attaching to drill pipe for lifting and transporting the same, comprising:

an elevator body having a central vertical drill pipe receiving opening therethrough and opposed horizontally extending bail receiving hook portions, the body having a door opening in the front side thereof providing an opening of sufficient width to receive drill pipe therethrough;

a door pivotally affixed about a vertical axis to said body and movable between an open position exposing said door opening of said body and a closed position;

a shaft journaled in said body from front to back;

a latch arm affixed to the front of said shaft and movable from a first position engaging and retaining said door in the closed position to a second position permitting said door to open;

an operating arm depending from said shaft at the back of said body; and a cylinder piston member connected between said operating arm and said elevator body to selectably move said latch from said first to said second position in response to fluid pressure.

9. An elevator for removably attaching to drill pipe for lifting and transporting the same, comprising:

an elevator body having a central vertical drill pipe receiving opening therethrough and opposed horizontally extending bail receiving hook portions, the elevator body being pivotally suspended about a horizontal axis through said hook portions, the body having a door opening in the front side thereof providing an opening of sufficient width to receive drill pipe therethrough;

a door pivotally affixed about a vertical axis to said body and movable between an open position exposing said door opening of said body and a closed position; and an adjustable counterweight attached to said elevator providing means of adjusting the angle of tilt of the elevator about said horizontal axis.

10. An elevator according to claim 9 including:

an arm having an inner end and an outer end, the inner end being pivotally affixed to said body and the arm being pivotally adjustable in a plane perpendicular to said horizontal suspension axis, said counterweight being affixed to the outer end of said vertical arm.

11. An elevator according to claim 10 wherein said counterweight is longitudinally positionable on said vertical arm.

*12. An elevator apparatus for handling strands of drill pipe in a drilling mast, comprising:*

*an elevator body having a vertical central passageway therethrough, the body having an upper end and a lower end, and having a side opening in one side thereof communicating with the central passageway, the side opening being of sufficient width to receive drill pipe therethrough;*

*a pair of integral, opposed hooks extending from opposite sides of said body to either side of said side opening providing means of receiving bail links whereby the elevator body and pipe supported thereby may be raised or lowered in the mast;*

*a door pivotally supported about a vertical axis to said body and pivotal to an open position to fully expose said side opening to permit pipe to be moved in or out of said body central passageway, and pivotal to a closed position to retain pipe within said central passageway;*

*an elevator base having a base central passageway therethrough of diameter at least equal said body central passageway and having a pipe receiving side opening in one side thereof communicating with said base central passageway, the elevator base having opposed ends;*

*means of detachably securing said base to said body wherein said passageways and side openings are in alignment and said base opposed ends and said body integral hooks are in a common vertical plane;*

*means removably interposed between said elevator base opposed ends and said body hooks for removably maintaining bail links in engagement with said body hooks.*

*13. An elevator apparatus for handling strands of drill pipe in a drilling mast according to claim 12 wherein said means removably interposed between said elevator base opposed ends and said body hooks includes a locking member pivotally secured to each elevator base opposed end, each locking member configured to extend in one position towards said body hook to prevent bail links from moving out of engagement with said hooks and pivotal in another direction to permit bail links to pass freely into or out of engagement with said hooks;*

*and including spring means between said elevator base and each said locking member normally urging said locking members in positions to prevent bail links from disengaging contact with said body hooks.*

*14. An elevator apparatus for handling strands of drill pipe in a drilling mast according to claim 12 wherein said body central passageway has a larger upper diameter and a smaller lower diameter presenting an upper facing internal shoulder, and including;*

*a bushing of internal diameter and seating surface suited to a preselected diameter and shape of a drill pipe tool joint, with said bushing having an external diameter and configuration to match said body central passageway and to engage said internal shoulder, said bushing having a cutaway as a side opening of sufficient width to receive a drill pipe therethrough, said bushing being positionable in said body with said body side opening, said base side opening and the bushing side opening in registry, and wherein the inner surface of said door matches the inner surface of the bushing such that when said door is closed the inner surfaces of said bushing and door are symmetrical.*

* * * * *